United States Patent
Hampel et al.

(10) Patent No.: US 10,701,727 B2
(45) Date of Patent: Jun. 30, 2020

(54) TECHNIQUES AND APPARATUSES FOR RESOURCE MANAGEMENT FOR A WIRELESS NETWORK

(71) Applicant: QUALCOMM Incorporated, San Diego, CA (US)

(72) Inventors: Karl Georg Hampel, Hoboken, NJ (US); Junyi Li, Chester, NJ (US); Sundar Subramanian, San Diego, CA (US); Muhammad Nazmul Islam, Edison, NJ (US); Navid Abedini, Raritan, NJ (US); Juergen Cezanne, Ocean Township, NJ (US)

(73) Assignee: Qualcomm Incorporated

( * ) Notice: Subject to any disclaimer, the term of this patent is extended or adjusted under 35 U.S.C. 154(b) by 0 days.

(21) Appl. No.: 16/017,614

(22) Filed: Jun. 25, 2018

(65) Prior Publication Data

US 2019/0021108 A1 Jan. 17, 2019

Related U.S. Application Data

(60) Provisional application No. 62/532,215, filed on Jul. 13, 2017.

(51) Int. Cl.
*H04W 72/14* (2009.01)
*H04W 72/04* (2009.01)
(Continued)

(52) U.S. Cl.
CPC ......... *H04W 72/14* (2013.01); *H04W 72/042* (2013.01); *H04W 72/0426* (2013.01);
(Continued)

(58) Field of Classification Search
CPC ............. H04W 72/14; H04W 72/0426; H04W 72/1257; H04W 72/0493; H04W 72/042;
(Continued)

(56) References Cited

U.S. PATENT DOCUMENTS 8,422,961 B2 * 4/2013 Kafle ...................... H01Q 3/26
455/67.14
9,560,140 B2 * 1/2017 Giaretta .................. H04W 4/00
(Continued)

FOREIGN PATENT DOCUMENTS

EP 1786217 A1 5/2007

OTHER PUBLICATIONS

International Search Report and Written Opinion—PCT/US2018/039483—ISA/EPO—dated Sep. 25, 2018.
(Continued)

*Primary Examiner* — Brian T O Connor
(74) *Attorney, Agent, or Firm* — Harrity & Harrity, LLP

(57) ABSTRACT

Certain aspects of the present disclosure generally relate to wireless communication. A wireless node may receive a first scheduling command identifying a first resource allocation via a first link, may determine a second resource allocation based at least in part on the first resource allocation and a resource allocation policy, may transmit a second scheduling command identifying the second resource allocation via a second link, and may communicate network traffic on the first link and the second link using the first resource allocation and the second resource allocation, respectively. Numerous other aspects are provided.

30 Claims, 10 Drawing Sheets

(51) Int. Cl.
*H04W 72/12* (2009.01)
*H04W 92/20* (2009.01)

(52) U.S. Cl.
CPC ... *H04W 72/0493* (2013.01); *H04W 72/1257* (2013.01); *H04W 72/048* (2013.01); *H04W 72/0433* (2013.01); *H04W 92/20* (2013.01)

(58) Field of Classification Search
CPC ............... H04W 72/048; H04W 92/20; H04W 72/0433
See application file for complete search history.

(56) References Cited

U.S. PATENT DOCUMENTS

| | | | | |
|---|---|---|---|---|
| 10,079,630 | B2 * | 9/2018 | Kim | H04B 7/0413 |
| 10,219,296 | B2 * | 2/2019 | Fodor | H04W 16/14 |
| 10,490,895 | B2 * | 11/2019 | Abdallah | H04B 7/088 |
| 10,524,183 | B2 * | 12/2019 | Abdallah | H04L 45/745 |
| 2010/0159935 | A1 * | 6/2010 | Cai | H04W 72/042 455/450 |
| 2010/0214169 | A1 * | 8/2010 | Kafle | H04B 7/0639 342/368 |
| 2011/0256896 | A1 * | 10/2011 | Giaretta | H04W 4/00 455/509 |
| 2016/0149815 | A1 * | 5/2016 | Cotter | H04L 43/0876 370/235 |
| 2016/0269097 | A1 | 9/2016 | Islam et al. | |
| 2017/0163330 | A1 * | 6/2017 | Raleigh | H04L 5/0037 |
| 2018/0098332 | A1 * | 4/2018 | Shi | H04W 28/20 |
| 2018/0132247 | A1 * | 5/2018 | Kwon | H04B 7/155 |
| 2018/0167323 | A1 * | 6/2018 | Cotter | H04L 43/0876 |
| 2018/0338320 | A1 * | 11/2018 | Fodor | H04W 16/14 |

OTHER PUBLICATIONS

QUALCOMM: "Forward Compatibility Considerations on NR Integrated Access and Backhaul," 3GPP Draft; R1-167119, 3rd Generation Partnership Project (3GPP), Mobile Competence Centre; 650, Route Des Lucioles; F-06921 Sophia-Antipolis Cedex; France, Aug. 22, 2016-Aug. 26, 2016, XP051142525, 6 pages, Retrieved from the Internet: URL: http://www.3gpp.org/ftp/tsg_ran/WG1_RL1/TSGR1_86/Docs/ [retrieved on Aug. 13, 2016].

QUALCOMM: "Motivation for SID on Integrated Access & Backhaul (IAB) in NR", 3GPP Draft; RP-170176 Motivation for SID on IAB IN NR, 3rd Generation Partnership Project (3GPP), Mobile Competence Centre; 650, Route Des Lucioles; F-06921 Sophia-Antipolis Cedex; France, No. Dubrovnik, Croatia; Mar. 6, 2017-Mar. 9, 2017 Mar. 5, 2017, XP051233621, Retrieved from the Internet: URL:http://www.3gpp.org/ftp/Meetings_3GPP_SYNC/RAN/Docs/ [retrieved on Mar. 5, 2017], 14 pages.

* cited by examiner

TECHNIQUES AND APPARATUSES FOR RESOURCE MANAGEMENT FOR A WIRELESS NETWORK

CROSS-REFERENCE TO RELATED APPLICATIONS UNDER 35 U.S.C. § 119

This application claims priority to Provisional Patent Application No. 62/532,215, filed on Jul. 13, 2017, entitled "TECHNIQUES AND APPARATUSES FOR RESOURCE MANAGEMENT FOR A WIRELESS NETWORK," which is hereby expressly incorporated by reference herein.

INTRODUCTION

Aspects of the present disclosure generally relate to wireless communication, and more particularly to techniques and apparatuses for resource management for a wireless network.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, Long Term Evolution (LTE), and New Radio (NR).

A wireless communication network may include a number of base stations (BSs) that can support communication for a number of user equipment (UEs). A UE may communicate with a BS via the downlink and uplink. The downlink (or forward link) may refer to the communication link from the BS to the UE, and the uplink (or reverse link) may refer to the communication link from the UE to the BS. As will be described in more detail herein, a BS may be referred to as a Node B, a gNB, an access point (AP), a radio head, a transmit receive point (TRP), a new radio (NR) BS, a 5G Node B, a wireless node, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may include receiving a first scheduling command identifying a first resource allocation via a first link; determining a second resource allocation based at least in part on the first resource allocation and a resource allocation policy; transmitting a second scheduling command identifying the second resource allocation via a second link; and communicating network traffic on the first link and the second link using the first resource allocation and the second resource allocation, respectively.

In some aspects, a wireless node for wireless communication may include a memory and one or more processors operatively coupled to the memory. The one or more processors may be configured to receive a first scheduling command identifying a first resource allocation via a first link; determine a second resource allocation based at least in part on the first resource allocation and a resource allocation policy; transmit a second scheduling command identifying the second resource allocation via a second link; and communicate network traffic on the first link and the second link using the first resource allocation and the second resource allocation, respectively.

In some aspects, an apparatus for wireless communication may include means for receiving a first scheduling command identifying a first resource allocation via a first link; means for determining a second resource allocation based at least in part on the first resource allocation and a resource allocation policy; means for transmitting a second scheduling command identifying the second resource allocation via a second link; and means for communicating network traffic on the first link and the second link using the first resource allocation and the second resource allocation, respectively.

In some aspects, a non-transitory computer-readable medium may include one or more instructions for wireless communication. The one or more instructions, when executed by one or more processors, may cause the one or more processors to receive a first scheduling command identifying a first resource allocation via a first link; determine a second resource allocation based at least in part on the first resource allocation and a resource allocation policy; transmit a second scheduling command identifying the second resource allocation via a second link; and communicate network traffic on the first link and the second link using the first resource allocation and the second resource allocation, respectively.

Aspects generally include a method, a wireless node, an apparatus, a non-transitory computer-readable medium, a computer program product, a user equipment, and a base station as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
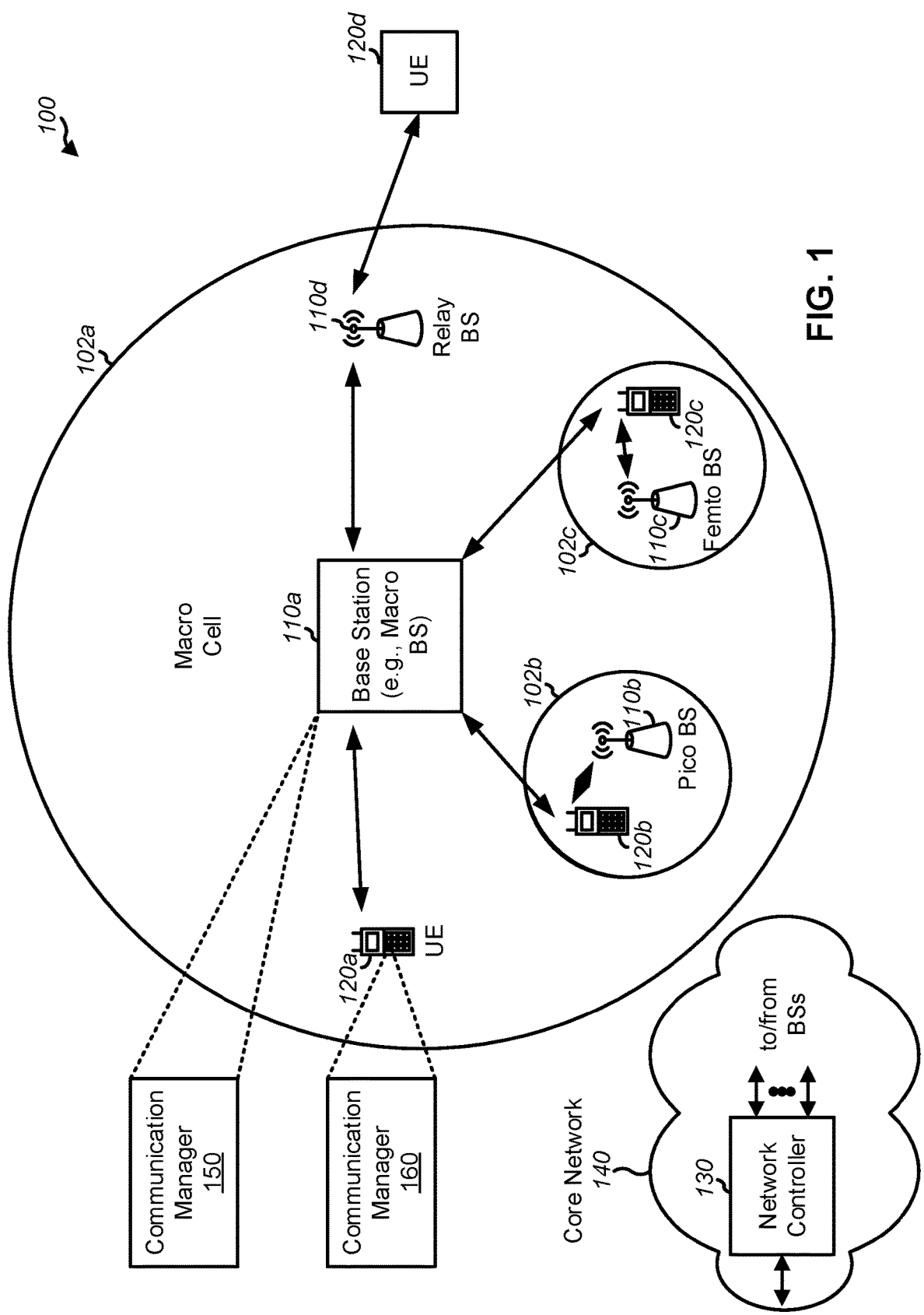
FIG. 1 is a block diagram conceptually illustrating an example of a wireless communication network, in accordance with various aspects of the present disclosure.

A wireless backhaul network, which may also be termed a backhauling network, may be deployed to provide connectivity to a core network. In the wireless backhaul network, a first set of wireless nodes, such as a set of base stations, may communicate with the core network via a set of wired connections (e.g., a fiber connection), and a second set of wireless nodes, such as another set of base stations, a set of user equipment (UEs), and/or the like, may communicate with the first set of wireless nodes via a set of links.

In some cases, a chain of wireless nodes may communicate via links along the chain to form a path to a wireless node with a wired connection to the core network. In some cases, an arrangement of wireless nodes may form a mesh network. Although some aspects, described herein, are described in terms of a backhaul network, some aspects, described herein, may be used in connection with another type of network, such as a fronthaul network.

A mesh wireless communication backhauling network may permit simple and cheap deployment of additional base stations, because base stations may be able to detect one another automatically, and may be deployed without expensive infrastructure, such as wired connections. Furthermore, network resources (e.g., frequency resources, time resources, and/or the like) may be shared between wireless access links (e.g., links between a base station and a UE or between UEs) and wireless backhaul links (e.g., links between base stations), thereby enhancing link capacity and reducing network latency. In some cases, the base stations and/or UEs may utilize millimeter waves and/or directional communications (e.g., beamforming, precoding, and/or the like) for the links to reduce inter-link interference.

To support automatic deployment of new wireless nodes, a deployed wireless node may periodically transmit communications associated with synchronizing utilization of available communication resources. For example, a centralized wireless node may transmit a scheduling command to each of a set of other wireless nodes to indicate a set of frequency resources, time resources, code resources, and/or the like, that the set of other wireless nodes may use to transmit data. In this way, the centralized wireless node may ensure that a half-duplexing constraint is satisfied for the links by scheduling resources such that a link between two wireless nodes is not to be used for concurrent two-way communications.

However, in a mesh wireless communication network, such as for wireless backhauling or wireless fronthauling, network-wide partitioning of resources may result in underutilization of resources. For example, use of millimeter wave (mmWave) radio access technologies (RATs) or multiple input multiple output (MIMO) techniques may enable some wireless nodes to reuse frequency resources, time resources, code resources, and/or the like for adjacent links by using different spatial resources (e.g., antennas, antenna patterns, antenna beams, and/or the like). In some cases, some other wireless nodes (e.g., in a same mesh wireless communication network) may be limited to transmitting traffic on multiple links or receiving traffic on multiple links in accordance with a half-duplexing constraint, such as based at least in part on a limited isolation between antenna patterns for adjacent links. Some aspects, described herein, may enable distributed resource management for a mesh wireless communication network, such as a backhauling network or a fronthauling network, using a hierarchical network resource management topology. Additional details are described elsewhere herein.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Using the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be a 5G or NR network or some other wireless network, such as an LTE network. Wireless network 100 may include a number of base stations (BSs) 110 (shown as BS 110a, BS 110b, BS 110c, and BS 110d) and other network entities. A BS is an entity that communicates with user equipment (UEs) and/or other BSs, and may also be referred to as a Node B, an eNB, a gNB, a NR BS, a 5G NB, an access point, a transmit receive point (TRP), an access node (AN), and/or the like. Each BS may provide communication coverage for a particular geographic area. In 3GPP, the term "cell" can refer to a coverage area of a BS and/or a BS subsystem serving this coverage area, depending on the context in which the term is used. As used herein, the term "wireless node" may refer to a base station and/or a user equipment.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, a link (e.g., a wireless backhaul link), and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, a wireless node, and/or the like.

In some aspects, a relay station may be hierarchically related to one or more other relay stations. For example, with regard to a particular wireless node, the particular wireless node may communicate with one or more hierarchically superior wireless nodes that may be termed parent wireless nodes of the wireless node, and may communicate with one or more hierarchically inferior wireless nodes that may be termed child wireless nodes of the wireless node. Scheduling commands may be provided based at least in part on a hierarchical relationship of wireless nodes. For example, a parent wireless node may provide a first scheduling command to a wireless node via a first link to identify a first resource allocation, and the wireless node may provide a second scheduling command to a child wireless node via a second link to identify a second resource allocation. In this case, the wireless node may communicate with the parent wireless node via the first link and using the first resource allocation and with the child wireless node via the second link and using the second resource allocation.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, network controller 130 may be implemented in a core network 140.

Core network 140 may include one or more devices to communicate with and/or control BSs 110 and/or one or more devices to route packets through core network 140 to one or more other networks. For example, core network 140 may include a mobility management entity (MME), a serving gateway (SGW), a packet data network (PDN) gateway (PGW), a home subscriber server (HSS), a policy charging and rules function (PCRF), an authentication, authorization, and accounting (AAA) server, and/or the like.

UEs 120 (e.g., 120a, 120b, 120c, 120d) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) UEs and/or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. MTC UEs, as well as other types of UEs, may be implemented as narrowband internet of things (NB-IoT) devices. UE 120 may be included inside a housing that houses components of UE 120, such as processor components, memory components, and/or the like. As used herein, the term "wireless node" may refer to a BS 110 and/or a UE 120.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

As shown in FIG. 1, base station 110 may include a communication manager 150. As described in more detail elsewhere herein, communication manager 150 may receive a first scheduling command identifying a first resource allocation via a first link, may determine a second resource allocation based at least in part on the first resource allocation and a resource allocation policy, may transmit a second scheduling command identifying the second resource allocation via a second link, may communicate network traffic on the first link and the second link using the first resource allocation and the second resource allocation, respectively, and/or may perform one or more other operations described herein. Communication manager 150 may include one or more components of FIG. 2, as described below.

Similarly, UE 120 may include a communication manager 160. As described in more detail elsewhere herein, communication manager 160 may receive a first scheduling command identifying a first resource allocation via a first link, may determine a second resource allocation based at least in part on the first resource allocation and a resource allocation policy, may transmit a second scheduling command identifying the second resource allocation via a second link, may communicate network traffic on the first link and the second link using the first resource allocation and the second resource allocation, respectively, and/or may perform one or more other operations described herein. Communication manager 160 may include one or more components of FIG. 2, as described below.

As indicated above, FIG. 1 is provided as an example. Other examples are possible and may differ from what was described with regard to FIG. 1.

Figure 2:
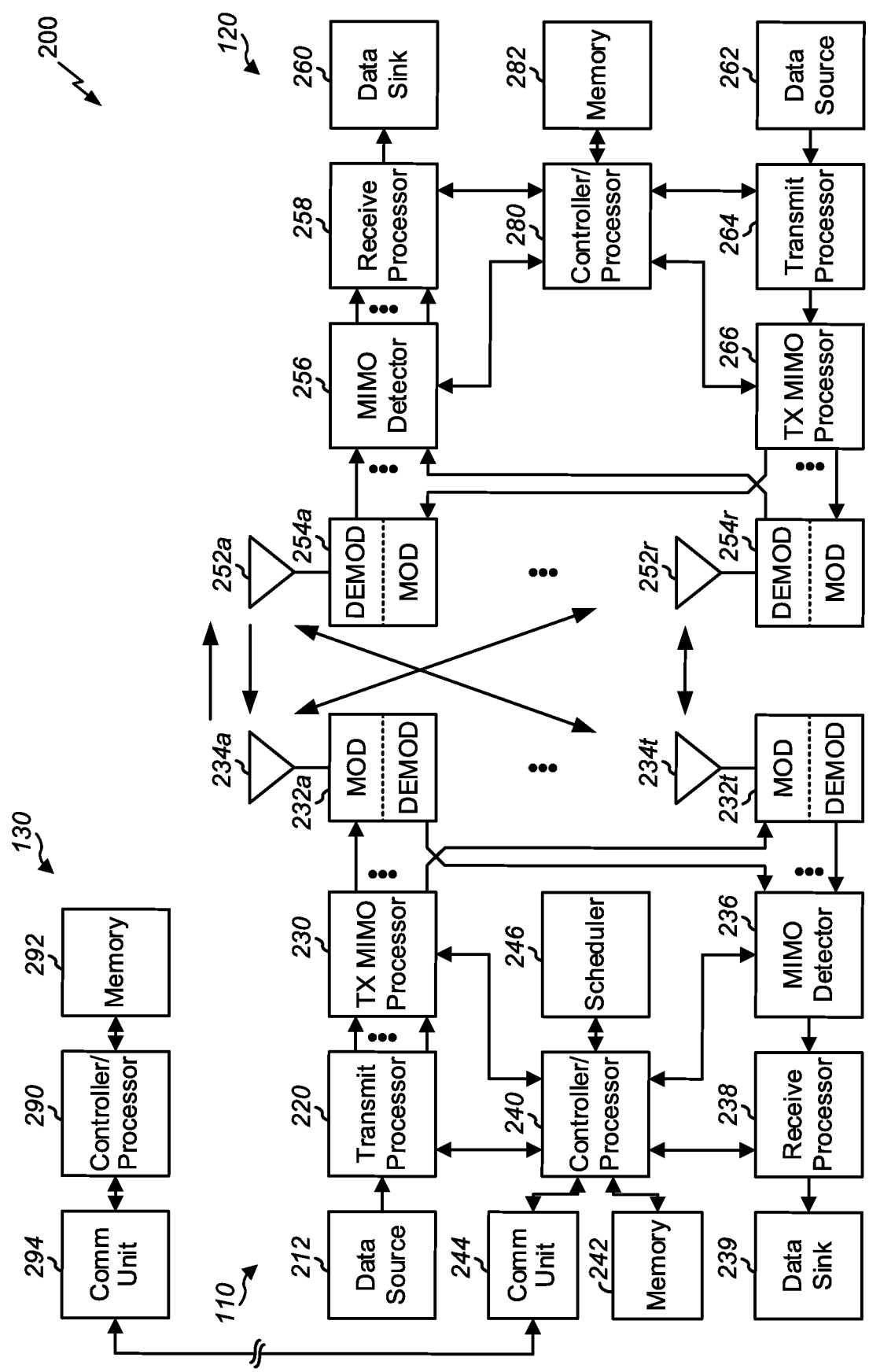
FIG. 2 shows a block diagram conceptually illustrating an example of a base station in communication with a user equipment (UE) in a wireless communication network, in accordance with various aspects of the present disclosure.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., DMRS, CRS, and/or the like) and synchronization signals (e.g., a PSS, an SSS, and/or the like).

A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292. Memories 242 and 282 may store data and program codes for base station 110 and UE 120, respectively. A scheduler 246 may schedule UEs for data transmission on the downlink and/or uplink.

In some aspects, one or more components of UE 120 may be included in a housing. Controllers/processors 240 and 280 and/or any other component(s) in FIG. 2 may direct the operation at base station 110 and UE 120, respectively, to perform operations associated with resource management for a wireless network, as described in more detail elsewhere herein. For example, controller/processor 240 and/or 280 and/or other processors and modules at base station 110 and/or UE 120, may perform or direct operations of base station 110 and/or UE 120 to perform one or more operations associated with receiving a first scheduling command identifying a first resource allocation via a first link, determining a second resource allocation based at least in part on the first resource allocation and a resource allocation policy, transmitting a second scheduling command identifying the second resource allocation via a second link, and/or communicating network traffic on the first link and the second link using the first resource allocation and the second resource allocation, respectively. For example, controller/processor 240 and/or other controllers/processors and modules at base station 110 and/or UE 120 may perform or direct operations of, for example, process 700 of FIG. 7 and/or other processes described herein. In some aspects, one or more of the components shown in FIG. 2 may be employed to perform example process 700 and/or other processes for the techniques described herein.

Additionally, or alternatively, base station 110 and/or UE 120 may include means for receiving a first scheduling command identifying a first resource allocation via a first link, means for determining a second resource allocation based at least in part on the first resource allocation and a resource allocation policy, means for transmitting a second scheduling command identifying the second resource allocation via a second link, means for communicating network traffic on the first link and the second link using the first resource allocation and the second resource allocation, respectively, and/or means for performing other operations described herein. Such means may include one or more components shown in FIG. 2.

As indicated above, FIG. 2 is provided as an example. Other examples are possible and may differ from what was described with regard to FIG. 2.

Figure 3:
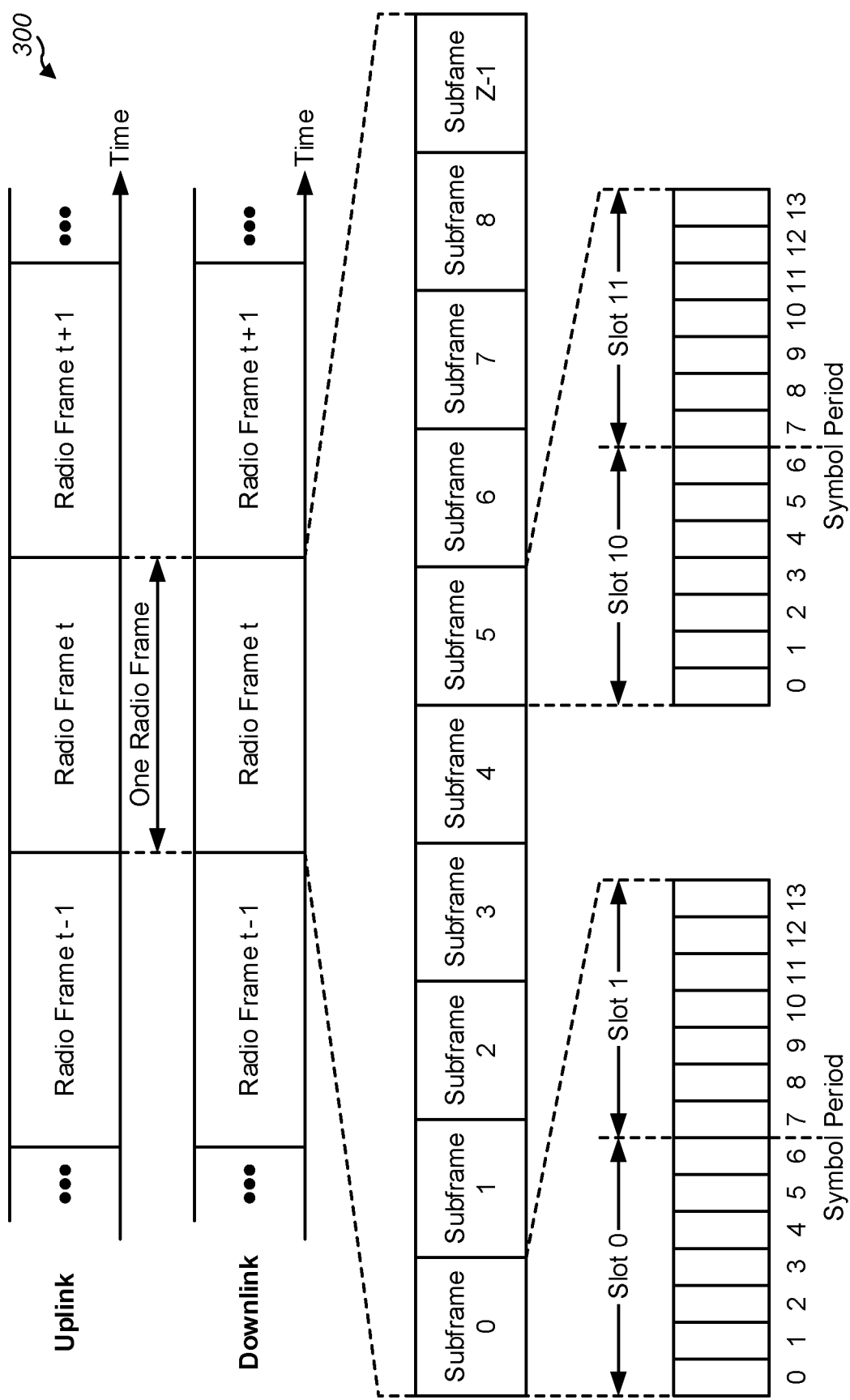
FIG. 3 is a block diagram conceptually illustrating an example of a frame structure in a wireless communication network, in accordance with various aspects of the present disclosure.

FIG. 3 shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z ($Z \geq 1$) subframes (e.g., with indices of 0 through Z-1). Each subframe may include a set of slots (e.g., two slots per subframe are shown in FIG. 3). Each slot may include a set of L symbol periods. For example, each slot may include seven symbol periods (e.g., as shown in FIG. 3), fifteen symbol periods, and/or the like. In a case where the subframe includes two slots, the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3 may be used.

In certain telecommunications (e.g., NR), a BS may transmit synchronization signals (e.g., a primary synchronization signal (PSS), a secondary synchronization signal (SSS), and/or the like) on the downlink for each cell supported by the BS. The PSS and SSS may be used by UEs for cell search and acquisition, and/or may be used by other BSs for automatic deployment in a wireless backhaul network. For example, the PSS may be used by UEs and/or BSs to determine symbol timing, and the SSS may be used by UEs and/or BSs to determine a physical cell identifier associated with the BS, and frame timing. The BS may also transmit a physical broadcast channel (PBCH). The PBCH may carry some system information, such as system information that supports initial access by UEs and/or BSs. In some aspects, the PBCH may include a scheduling command that identifies, explicitly or implicitly, a resource allocation for a receiving wireless node, a child wireless node of the receiving wireless node, and/or the like.

In some aspects, the base station may transmit the PSS, the SSS, and/or the PBCH in accordance with a communication hierarchy. For example, a wireless node (e.g., the base station) may receive a PBCH from a parent wireless node (e.g., another base station hierarchically superior to the base station with regard to a first link) identifying a first resource allocation for the first link between the wireless node and the parent wireless node. In this case, the wireless node may determine a compliant resource (e.g., a second resource allocation that does not interfere with the first resource allocation) based at least in part on the first resource allocation and a resource allocation policy, and may transmit another PBCH to a child wireless node (e.g., another base station hierarchically inferior to the base station with regard to a second link) identifying the second resource allocation for the second link.

The BS may transmit system information, such as system information blocks (SIBs) on a physical downlink shared channel (PDSCH) in certain subframes. The BS may transmit control information/data on a physical downlink control channel (PDCCH) in B symbol periods of a subframe, where B may be configurable for each subframe. The BS may transmit traffic data and/or other data on the PDSCH in the remaining symbol periods of each subframe.

As indicated above, FIG. 3 is provided as an example. Other examples are possible and may differ from what was described with regard to FIG. 3.

Figure 4:
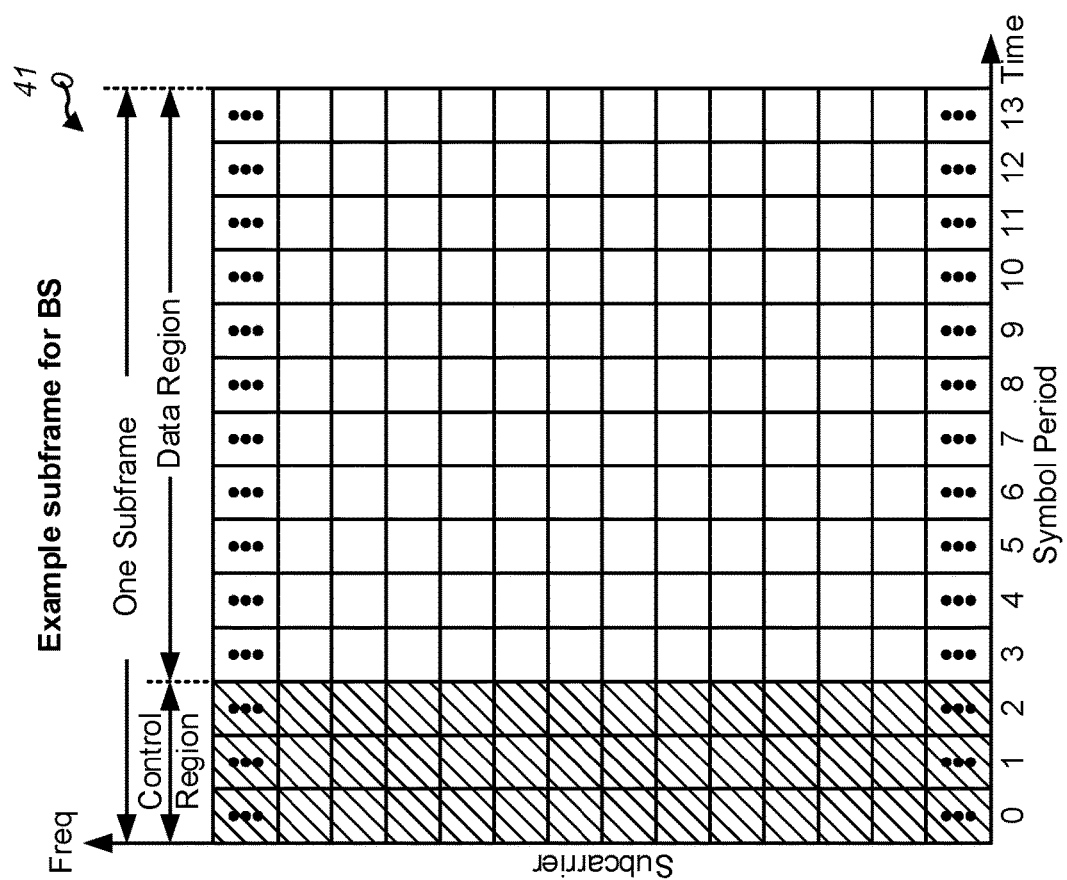
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover 12 subcarriers in one slot and may include a number of resource elements. Each resource element may cover one subcarrier in one symbol period (e.g., in time) and may be used to send one modulation symbol, which may be a real or complex value. In some aspects, subframe format 410 may be used for transmission of the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈ {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 ms duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5A:
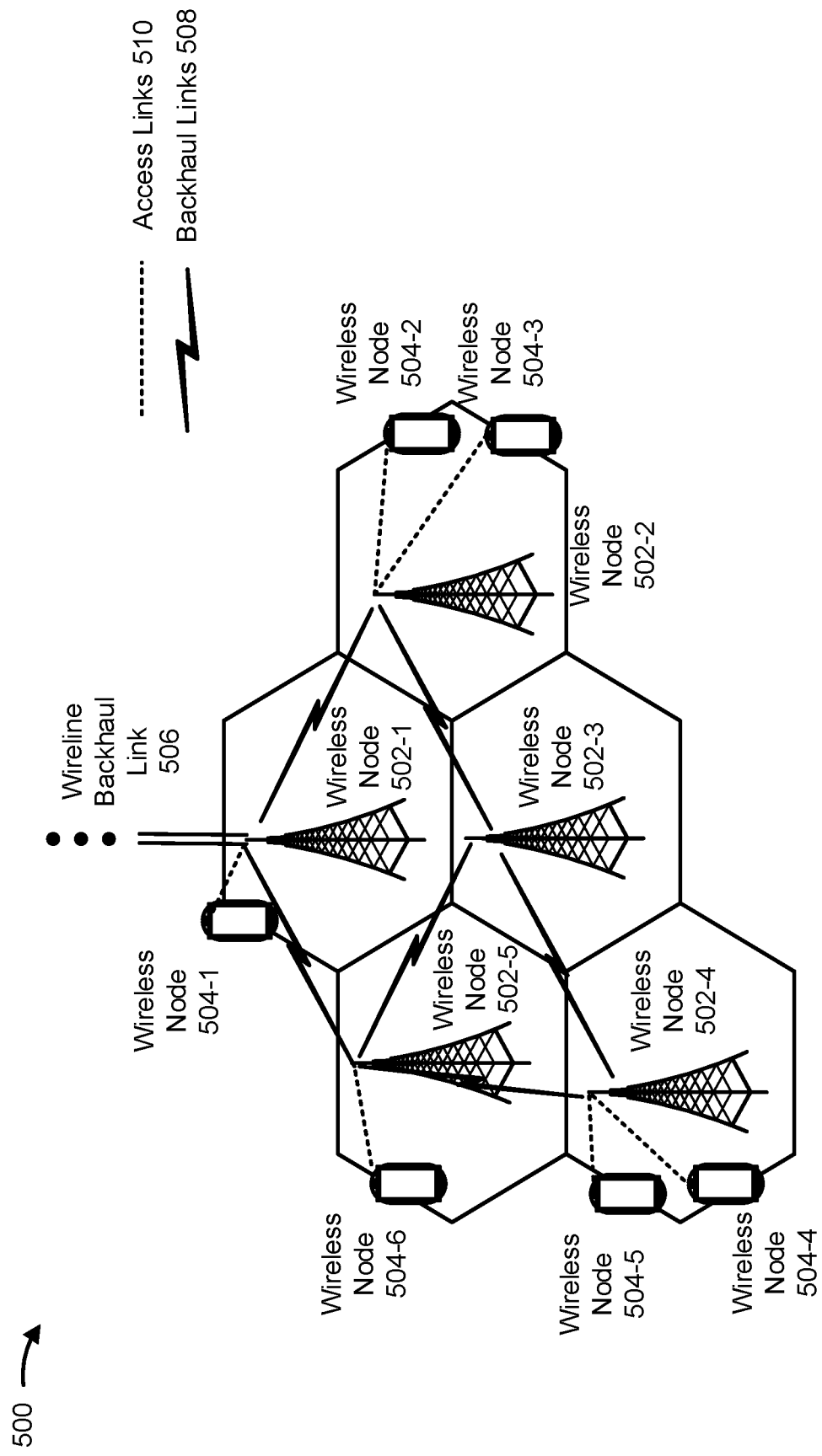
FIG. 5A is a diagram illustrating examples of a mesh wireless communication backhauling network, in accordance with various aspects of the present disclosure.
Figure 5B:
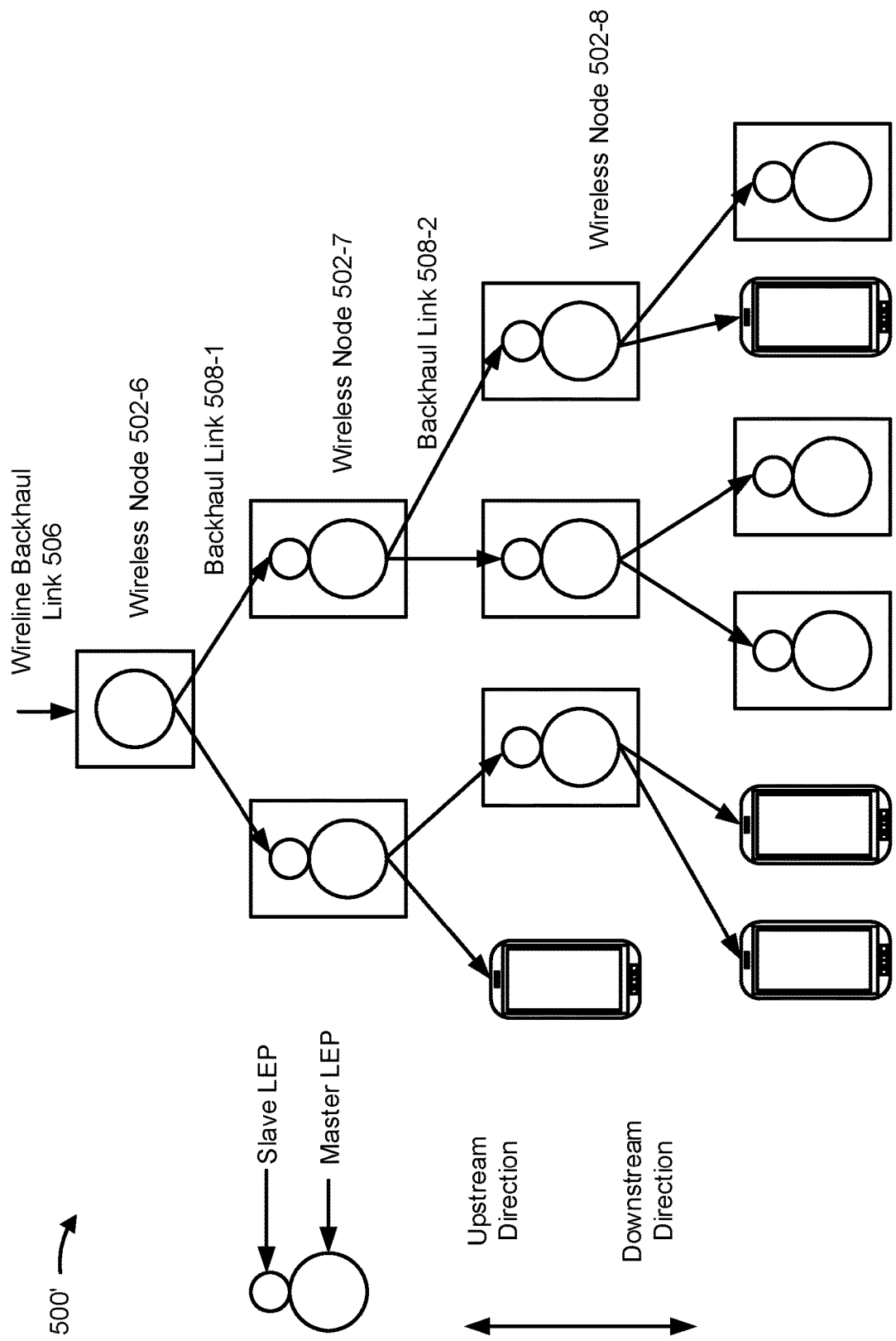
FIG. 5B is a block diagram conceptually illustrating an example hierarchy for a mesh wireless communication backhauling network, in accordance with various aspects of the present disclosure.
Figure 5C:
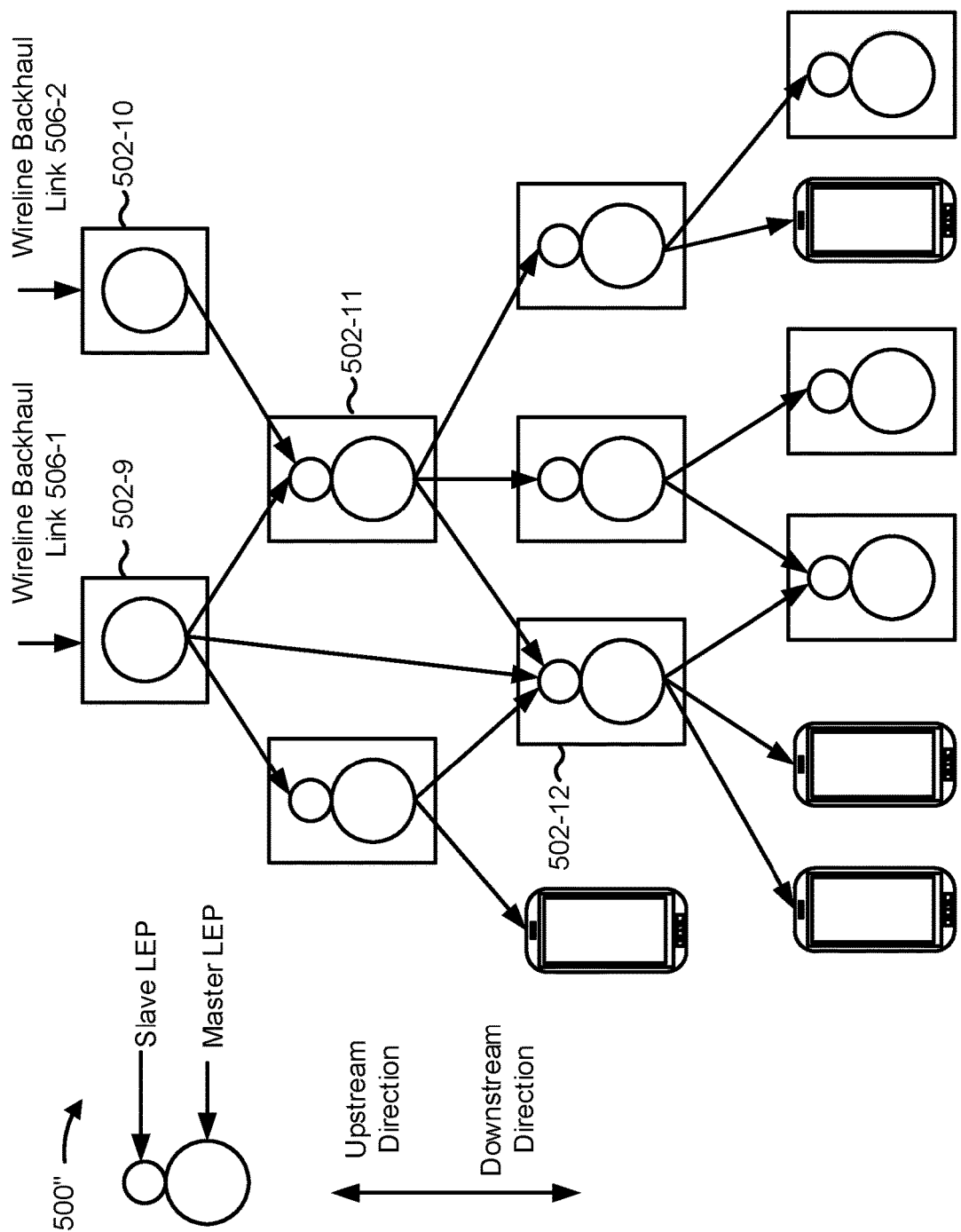
FIG. 5C is a block diagram conceptually illustrating another example hierarchy for a mesh wireless communication backhauling network, in accordance with various aspects of the present disclosure.

FIGS. 5A-5C are diagram illustrating examples 500/500'/500" of radio access networks, in accordance with various aspects of the disclosure.

As shown in FIG. 5A, example, 500 may include multiple wireless nodes 502 (e.g., base stations) and multiple wireless nodes 504 (e.g., UEs). At least one wireless node (e.g., wireless node 502-1) may communicate with a core network via wireline backhaul link 506, such as a fiber connection. Wireless nodes 502 may communicate with each other using a set of backhaul links 508, such as a set of mmWave links. A wireless node 502 may communicate with a wireless node 504 via an access link 510 (e.g., a 3G, 4G, 5G, etc. air interface). In some aspects, a wireless node 502 shown in FIG. 5A may correspond to a base station 110 or UE 120 shown in FIG. 1. Similarly, a wireless node 504 shown in FIG. 5 may correspond to a base station 110 or a UE 120 shown in FIG. 1.

As further shown in FIG. 5A, one or more wireless nodes 502 or 504 may communicate indirectly via one or more other wireless nodes 502 or 504. For example, data may be transferred from a core network to wireless node 504-5 via wireline backhaul link 506, a backhaul link 508 between wireless node 502-1 and wireless node 502-5, a backhaul link 508 between wireless node 502-5 and wireless node 502-4, and an access link 510 between wireless node 502-4 and wireless node 504-5. In some aspects, multiple different paths may be used to communicate data between wireless nodes 502. For example, wireless node 502-5 may communicate with wireless node 502-4 via a single backhaul link 508 between wireless node 502-5 and wireless node 502-4 and/or via a first backhaul link 508 between wireless node 502-5 and wireless node 502-3 and a second backhaul link between wireless node 502-3 and wireless node 502-4.

As shown in FIG. 5B, wireless nodes 502 and wireless nodes 504 can be arranges in a hierarchical topology, such as a spanning tree, to enable management of network resources. Each backhaul link 508 and access link 510 may be associated with a master link end point (master LEP) and a slave link end point (slave LEP), which may define a hierarchy between wireless nodes. For example, wireless node 502-6 may communicate with wireless node 502-7 via backhaul link 508-1. In this case, wireless node 502-6 is associated with a master link end point and wireless node 502-7 is associated with a slave link end point for backhaul link 508-1, which may define wireless node 502-6 as hierarchically superior to wireless node 502-7, and wireless node 502-7 as hierarchically inferior to wireless node 502-6 with regard to backhaul link 508-1. Moreover, wireless node 502-6 may be defined as upstream relative to wireless node 502-7 (and wireless node 502-7 may be defined as downstream relative to wireless node 502-6).

Similarly, wireless node 502-7 includes a master link end point for backhaul link 508-2 and wireless node 502-8 includes a slave link end point for backhaul link 508-2. In this case, wireless node 502-7 is hierarchically superior and upstream to wireless node 502-8, and wireless node 502-8 is hierarchically inferior and downstream to wireless node 502-7 with regard to backhaul link 508-2. In this way, a mesh wireless communication network of backhaul links 508 and access links 510 may be represented in a hierarchical topology with link asymmetry.

As shown in FIG. 5C, wireless nodes 502 and wireless nodes 504 can be arranges in a hierarchical topology, such as a directed acyclic graph, to enable management of network resources. In this case, wireless nodes 502-9 and 502-10 may each be upstream relative to wireless node 502-11. Moreover, wireless nodes 502-9 and 502-11 may be upstream relative to wireless node 502-12. In this case, with regard to wireless node 502-12, wireless nodes 502-9 and 502-11 may be hierarchically superior to wireless node 502-12 with regard to respective backhaul links 508. Similarly, wireless node 502-9 may be hierarchically superior to wireless node 502-11 with regard to another backhaul link 508. In this way, a mesh network of backhaul links 508 and access links 510 may be represented in a hierarchical topology with link asymmetry.

The configuration of wireless nodes (e.g., base stations and UEs) in FIGS. 5A-5C is shown as an example, and other examples are possible. For example, other hierarchical topologies may be possible for wireless nodes, described herein.

As indicated above, FIGS. 5A-5C are provided as an example. Other examples are possible and may differ from what was described with regard to FIGS. 5A-5C.

Figure 6A:
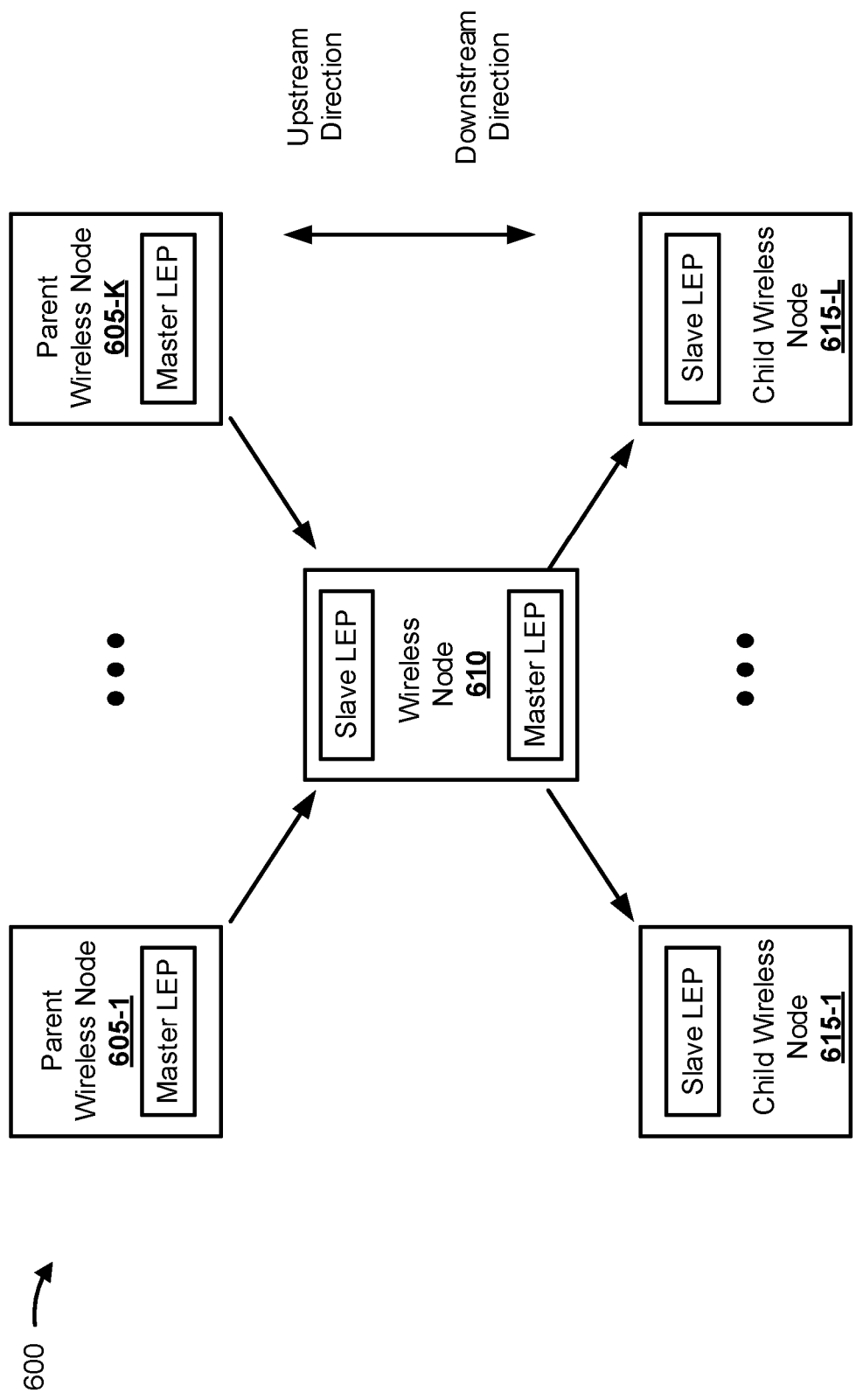
FIG. 6A is a block diagram conceptually illustrating a local hierarchy for a mesh wireless communication backhauling network, in accordance with various aspects of the present disclosure.
Figure 6B:
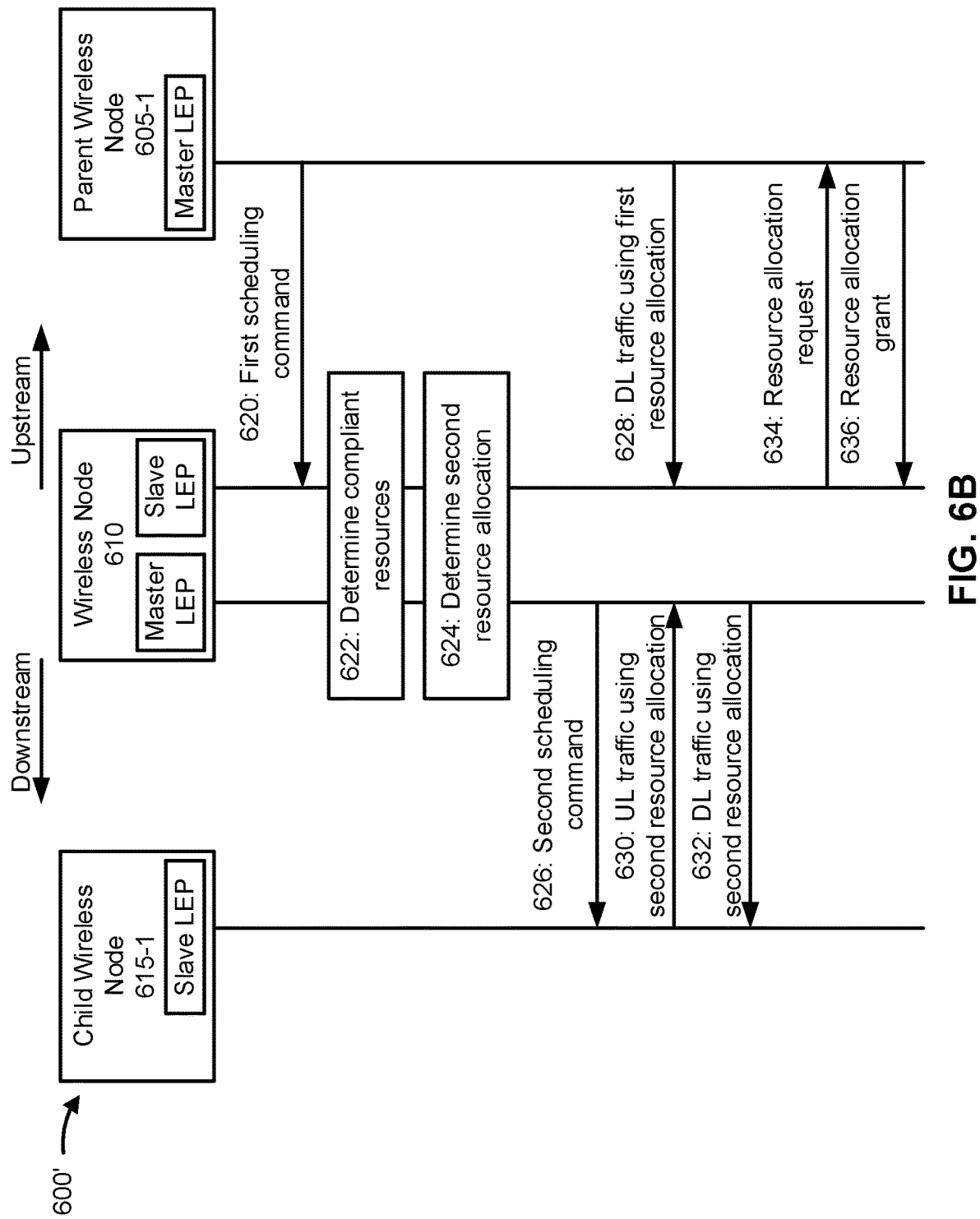
FIG. 6B is a diagram illustrating an example call flow diagram of hierarchical resource partitioning in a mesh wireless communication backhauling network, in accordance with various aspects of the present disclosure.

FIGS. 6A and 6B are diagrams illustrating examples 600/600' of resource management for a network, in accordance with various aspects of the present disclosure. FIG. 6A shows an example of a local hierarchy for a mesh wireless communication backhauling network and FIG. 6B shows an example of a call flow diagram of hierarchical resource partitioning in a mesh wireless communication backhauling network, in accordance with various aspects of the present disclosure.

As shown in FIG. 6A, a set of wireless nodes 605, 610, and 615 may be arranged in a local hierarchy with regard to wireless node 610. For example, relative to wireless node 610, wireless nodes 605-1 through 605-K (K≥1) represent one or more wireless nodes upstream of wireless node 610 (hereinafter referred to individually as "parent wireless node 605," and collectively as "parent wireless nodes 605"). In this case, each of the one or more parent wireless nodes 605 is associated with a master link end point (master LEP) for a backhaul link connecting the parent wireless node 605 to wireless node 610, and wireless node 610 may be associated with a slave link end point (slave LEP) for each of the one or more backhaul links connecting the wireless node 610 to each of the one or more parent wireless nodes 605. Although described herein as "wireless node 610," wireless node 610 may be a child wireless node of each of the parent wireless nodes 605.

Similarly, relative to wireless node 610, wireless nodes 615-1 through 615-L (L≥1) represent one or more wireless nodes downstream of wireless node 610 (hereinafter referred to individually as "child wireless node 615," and collectively as "child wireless nodes 615"). In this case, each of the one or more child wireless nodes 615 is associated with a slave link end point for a backhaul link connecting wireless node 610 to a child wireless node 615, and wireless node 610 may be associated with a master link end point for each of the one or more backhaul links connecting the wireless node 610 to each of the one or more child wireless nodes 615. Although described herein as "wireless node 610," wireless node 610 may be a parent wireless node of each of the child wireless nodes 615.

As shown in FIG. 6B, and by reference number 620, wireless node 610 may receive, from parent wireless node 605-1, a first scheduling command. For example, wireless node 610 may communicate with parent wireless node 605-1 to receive the first scheduling command via a first link between wireless node 610 and parent wireless node 605-1. In some aspects, the first scheduling command may include information identifying a first resource allocation for wireless node 610 to communicate network traffic. For example, wireless node 610 may determine a frequency dimension, time dimension, code dimension, spatial dimension (e.g., an antenna parameter, such as an antenna, an antenna pattern, an antenna beam, and/or the like that is to be used), and/or the like for use on the first link based at least in part on the first scheduling command. In some aspects, the first scheduling command may include a request for downlink traffic to be provided to wireless node 610 or a grant for uplink traffic to be provided from wireless node 610.

In some aspects, the first scheduling command may include information identifying one or more second resource allocations. For example, the first scheduling command may explicitly identify a second resource allocation for a second link (e.g., one or more links between wireless node 610 and one or more child wireless nodes 615). Additionally, or alternatively, the first scheduling command may implicitly identify the second resource allocation. In this case, the first scheduling command may lack information explicitly identifying the second resource allocation, but wireless node 610 may determine the second resource allocation based at least in part on the first resource allocation, an available set of resources, and a resource allocation policy.

In some aspects, the first scheduling command may be synchronized based at least in part on a frame structure. For example, a frame structure may be deployed for a backhauling network used by parent wireless nodes 605, wireless node 610, child wireless nodes 615, and/or the like that synchronizes signaling channels and traffic channels for links of the backhauling network. In this way, the backhauling network may be associated with reduced latency relative to unsynchronized signaling. In this case, wireless node 610 may be configured to communicate signaling using at least one of a set of signaling channels, a set of symbols of the set of signaling channels, a set of resource blocks of the set of signaling channels, a set of resource elements of the set of signaling channels, and/or the like. In some aspects, a scheduling command, such as the first scheduling command, may be transmitted using a downlink channel. For example, wireless node 610 may receive the first scheduling command in a physical downlink control channel (PDCCH), a physical downlink shared channel (PDSCH), and/or the like that is defined for the frame structure deployed for the backhauling network.

As further shown in FIG. 6B, and by reference number 622, wireless node 610 may determine compliant resources based at least in part on the first resource allocation and a resource allocation policy. A compliant resource may refer to a resource that permits concurrent communication on a downstream link and an upstream link for wireless node 610 given the first resource allocation. For example, wireless node 610 may determine a set of parameters, such as frequency parameters, time parameters, code parameters, spatial domain parameters, and/or the like that permit wireless node 610 to communicate on the downstream link (i.e., with child wireless node 615-1) without interfering with communication on the upstream link (i.e., with parent wireless node 605-1). In some aspects, wireless node 610 may determine compliant resources for a subset of channels. For example, based at least in part on receiving signaling (e.g., the first scheduling command) relating to a PDSCH or a physical uplink shared channel (PUSCH) (or a subset of symbols, time slots, and/or the like thereof), wireless node 610 may determine compliant resources corresponding to the PDSCH, PUSCH, and/or the like.

In some aspects, the compliant resources and the first resource allocation may be associated with a common communication type at a common time. For example, when wireless node 610 is associated with a half-duplexing constraint and wireless node 610 is scheduled for receiving communication from parent wireless node 605-1 at a particular time, wireless node 610 may determine that, at the particular time, compliant resources are resources used for receiving communication from child wireless node 615-1. In this case, wireless node 610 may determine to schedule an uplink transmission by child wireless node 615-1 at a common time with a downlink transmission by parent wireless node 605-1 and a downlink transmission to child wireless node 615-1 at another time. In some aspects, wireless node 610 may determine compliant resources based at least in part on another constraint. For example, wireless node 610 may determine, based at least in part on an isolation constraint, that the second link for communication is not to be used when using the first link for communication.

As further shown in FIG. 6B, and by reference number 624, wireless node 610 may determine a second resource allocation based at least in part on determining the compliant resources. For example, wireless node 610 may determine the second resource allocation (e.g., a time dimension, a frequency dimension, a code dimension, a spatial dimension, and/or the like for use on the second link) based at least in part on the compliant resources and a resource allocation policy. In some aspects, wireless node 610 may allocate all available compliant resources in the second resource allocation. Alternatively, wireless node 610 may allocate a subset of available compliant resources in the second resource allocation, such as based at least in part on information identifying an uplink buffer for child wireless node 615-1, information in a resource allocation policy indicating a threshold amount of resources to allocate or to maintain as unallocated, and/or the like. In some aspects, the resource allocation policy may be defined in a specification, received in an instruction (e.g., from parent wireless node 605-1), provisioned for wireless node 610, stored in a memory of wireless node 610, and/or the like. In some aspects, the resource allocation policy may be periodically updated, such as based at least in part on another wireless node being added to the backhauling network.

As further shown in FIG. 6B, and by reference number 626, wireless node 610 may transmit a second scheduling command to child wireless node 615-1. For example, wireless node 610 may transmit the second scheduling command via a second link between wireless node 610 and child wireless node 615-1. In some aspects, the second scheduling command includes information identifying the second resource allocation. For example, wireless node 610 may transmit the second scheduling command to identify the second resource allocation. In some aspects, the second scheduling command may include a request for downlink traffic to be provided from wireless node 610 or a grant for uplink traffic to be provided to wireless node 610.

In some aspects, wireless node 610 may transmit a scheduling command, such as the second scheduling command, using a particular antenna parameter. For example, wireless node 610 may use a first antenna parameter for the first link (e.g., a first antenna, a first antenna pattern, a first antenna beam, and/or the like for the first scheduling command or for communication on the first link) and a second antenna parameter for the second link.

In some aspects, the second resource allocation may include multiple resource allocations. For example, wireless node 610 may transmit the second scheduling command to identify a second resource allocation for an uplink transmission by child wireless node 615-1, and a second resource allocation for a downlink transmission to child wireless node 615-1. In some aspects, wireless node 610 may transmit the second scheduling command to identify, explicitly or implicitly, a third resource allocation from child wireless node 615-1 to one or more child wireless nodes of child wireless node 615-1.

As further shown in FIG. 6B, and by reference number 628, wireless node 610 may receive downlink traffic (DL traffic) from parent wireless node 605-1 using the first resource allocation. For example, wireless node 610 and parent wireless node 605-1 may communicate on the first link to cause the downlink traffic to be directed from parent wireless node 605-1 to wireless node 610.

As further shown in FIG. 6B, and by reference number 630, wireless node 610 may receive uplink traffic (UL traffic) from child wireless node 615-1 using the second resource allocation. For example, wireless node 610 and child wireless node 615-1 may communicate on the second link to cause the uplink traffic to be directed from child wireless node 615-1 to wireless node 610. In some aspects, wireless node 610 may receive the uplink traffic from child wireless node 615-1 using the second link and may receive the downlink traffic from parent wireless node 605-1 using the first link concurrently.

As further shown in FIG. 6B, and by reference number 632, wireless node 610 may provide downlink traffic to child wireless node 615-1 using the second resource allocation. For example, wireless node 610 and child wireless node 615-1 may communicate network traffic on the second link to cause the downlink traffic to be directed from wireless node 610 to child wireless node 615-1. In some aspects, wireless node 610 may transmit the downlink traffic to child wireless node 615-1 using the second link and may transmit uplink traffic to parent wireless node 605-1 using the first link concurrently.

As further shown in FIG. 6B, and by reference number 634, in some aspects, wireless node 610 may transmit a resource allocation request to parent wireless node 605-1. For example, wireless node 610 may determine that there is insufficient compliant resources for allocation to the second link based at least in part on information identifying an uplink buffer size of child wireless node 615-1. In this case, wireless node 610 may transmit the resource allocation request via the first link to cause parent wireless node 605-1 to alter a resource allocation to grant resources that can be used for the second link. In some aspects, wireless node 610 may transmit the resource allocation request based at least in part on receiving a resource allocation request from child wireless node 615-1.

In some aspects, wireless node 610 may transmit the resource allocation request via an uplink channel. For example, wireless node 610 may transmit the resource allocation request using a physical uplink control channel (PUCCH), a physical uplink shared channel (PUSCH), and/or the like defined for a frame structure deployed in the backhauling network. In some aspects, the resource allocation request may be included with an uplink acknowledgement (ACK) message, with an uplink negative acknowledgement (NACK) message, with uplink data traffic, and/or the like. In this way, wireless node 610 can cause a reduction in downlink traffic transmitted by parent wireless node 605-1.

As further shown in FIG. 6B, and by reference number 636, in some aspects, wireless node 610 may receive a resource allocation grant from parent wireless node 605-1.

For example, wireless node 610 may receive the resource allocation grant via the first link. In some aspects, wireless node 610 may transmit another scheduling command to child wireless node 615-1 to identify another resource allocation based at least in part on the resource grant. In some aspects, the resource allocation grant may be included in another scheduling message from parent wireless node 605-1, another type of downlink signaling message, and/or the like.

As indicated above, FIGS. 6A and 6B are provided as examples. Other examples are possible and may differ from what was described with regard to FIGS. 6A and 6B.

Figure 7:
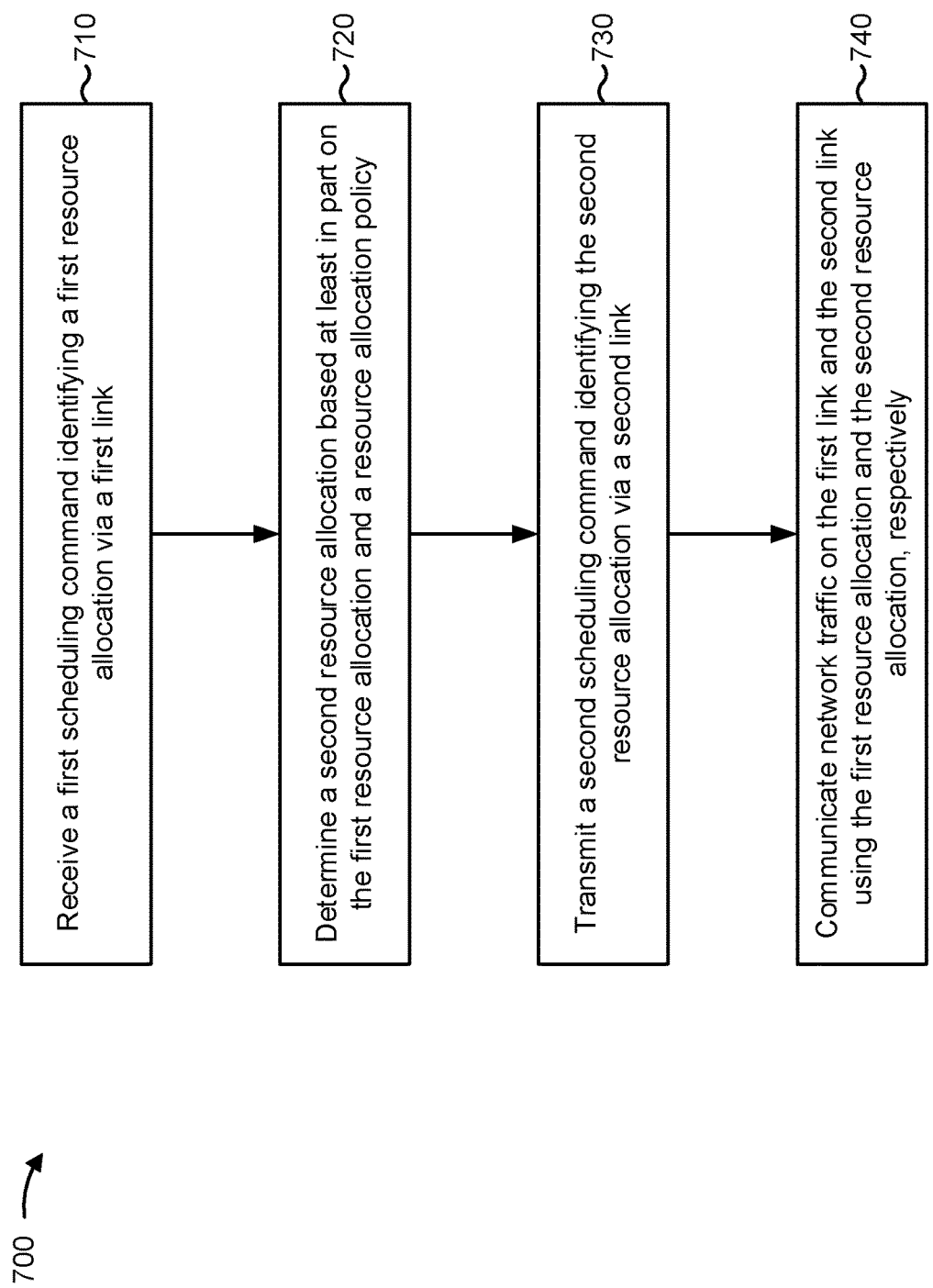
FIG. 7 is a diagram illustrating an example process performed, for example, by a wireless node, in accordance with various aspects of the present disclosure.

FIG. 7 is a diagram illustrating an example process 700 performed, for example, by a wireless node (e.g., a base station, a UE, at least one of wireless nodes 502, at least one of wireless nodes 504, at least one of wireless nodes 605, wireless node 610, at least one of wireless nodes 615, and/or the like), in accordance with various aspects of the present disclosure.

As shown in FIG. 7, in some aspects, process 700 may include receiving a first scheduling command identifying a first resource allocation via a first link (block 710). For example, the wireless node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive the first scheduling command from another wireless node (e.g., a parent wireless node upstream of the wireless node) via the first link, as described above.

As further shown in FIG. 7, in some aspects, process 700 may include determining a second resource allocation based at least in part on the first resource allocation and a resource allocation policy (block 720). For example, the wireless node (e.g., using controller/processor 240, controller/processor 280, and/or the like) may determine the second resource allocation for another wireless node (e.g., a child wireless node downstream of the wireless node) based at least in part on the first resource allocation and the resource allocation policy, as described above.

As further shown in FIG. 7, in some aspects, process 700 may include transmitting a second scheduling command identifying the second resource allocation via a second link (block 730). For example, the wireless node (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit the second scheduling command to another wireless node (e.g., a child wireless node downstream of the wireless node) via the second link, as described above.

As further shown in FIG. 7, in some aspects, process 700 may include communicating network traffic on the first link and the second link using the first resource allocation and the second resource allocation, respectively (block 740). For example, the wireless node (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may receive or transmit network traffic on the first link using the first resource allocation, and may receive or transmit network traffic on the second link using the second resource allocation, as described above.

Process 700 may include additional aspects, such as any single aspect or any combination of aspects described below and/or in connection with one or more other processes described elsewhere herein.

In some aspects, the communicating on the first link is based at least in part on the first scheduling command and the communicating on the second link is based at least in part on the second scheduling command. In some aspects, the first link is different from the second link. In some aspects, the first scheduling command includes an explicit indication of the second resource allocation or an implicit indication of the second resource allocation.

In some aspects, the first scheduling command is received on a first downlink control channel defined by a frame structure and the second scheduling command is transmitted on a second downlink control channel defined by the frame structure. In some aspects, the first scheduling command or the second scheduling command includes at least one of a request for downlink traffic or a grant for uplink traffic. In some aspects, downlink traffic is received on the first link or transmitted on the second link and uplink traffic is transmitted on the first link or received on the second link.

In some aspects, a third resource allocation is determined based at least in part on a result of transmitting a request for the third resource allocation on the first link, and a third scheduling command is provided on the second link to identify the third resource allocation. In some aspects, the first resource allocation and the second resource allocation are each associated with at least one of a time dimension, a frequency dimension, a code dimension, a spatial dimension, and/or the like. In some aspects, the first scheduling command is received based at least in part on a first antenna parameter and the second scheduling command is received based at least in part on a second antenna parameter that is different from the first antenna parameter.

In some aspects, network traffic communicated on the first link is communicated based at least in part on a first antenna parameter used for communicating the first scheduling command and network traffic communicated on the second link is communicated based at least in part on a second antenna parameter used for communicating the second scheduling command. In some aspects, the wireless node is a slave link end point for a master link end point associated with a parent wireless node on the first link. In some aspects, the wireless node is a master link end point for a slave link end point associated with a child wireless node on the second link.

In some aspects, the second resource allocation is determined to be a compliant resource based at least in part on the first resource allocation. In some aspects, the resource allocation policy is provisioned on the wireless node, configured on the wireless node, or communicated to the wireless node. In some aspects, the wireless node is positioned in a hierarchical relationship with a parent wireless node and a child wireless node.

In some aspects, the first link and the second link are synchronized with respect to a frame structure. In some aspects, the wireless node is configured to transmit a resource allocation request with an uplink acknowledgement, an uplink negative acknowledgement, or uplink traffic. In some aspects, the wireless node is configured to communicate signaling related to the first resource allocation or the second resource allocation using at least one of a set of channels, a set of symbols, a set of resource blocks, or a set of resource elements.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, comprising:
   receiving, by a wireless node and from a parent wireless node, a first scheduling command identifying a first resource allocation via a first link,
      wherein the first scheduling command includes an implicit indication of a second resource allocation;
   determining, by the wireless node, the second resource allocation based at least in part on the first resource allocation and a resource allocation policy;
   transmitting, by the wireless node and to a child wireless node, a second scheduling command identifying the second resource allocation via a second link; and
   communicating, by the wireless node, network traffic on the first link and the second link using the first resource allocation and the second resource allocation, respectively.

2. The method of claim 1, wherein the communicating on the first link is based at least in part on the first scheduling command and the communicating on the second link is based at least in part on the second scheduling command.

3. The method of claim 1, wherein the first link is different from the second link.

4. The method of claim 1, wherein the first scheduling command is received on a first downlink control channel defined by a frame structure and the second scheduling command is transmitted on a second downlink control channel defined by the frame structure.

5. The method of claim 1, wherein the first scheduling command or the second scheduling command includes at least one of a request for downlink traffic or a grant for uplink traffic.

6. The method of claim 1, wherein downlink traffic is received on the first link or transmitted on the second link and uplink traffic is transmitted on the first link or received on the second link.

7. The method of claim 1, wherein a third resource allocation is determined based at least in part on a result of transmitting a request for the third resource allocation on the first link; and
   wherein a third scheduling command is provided on the second link to identify the third resource allocation.

8. The method of claim 1, wherein the first resource allocation and the second resource allocation are each associated with at least one of:
   a time dimension,
   a frequency dimension,
   a code dimension, or
   a spatial dimension.

9. The method of claim 1, wherein the first scheduling command is received based at least in part on a first antenna parameter and the second scheduling command is received based at least in part on a second antenna parameter that is different from the first antenna parameter.

10. The method of claim 1, wherein network traffic communicated on the first link is communicated based at least in part on a first antenna parameter used for communicating the first scheduling command and network traffic communicated on the second link is communicated based at least in part on a second antenna parameter used for communicating the second scheduling command.

11. The method of claim 1, wherein the wireless node is a slave link end point for a master link end point associated with the parent wireless node, and wherein the parent wireless node is on the first link.

12. The method of claim 1, wherein the wireless node is a master link end point for a slave link end point associated with the child wireless node, and wherein the child wireless node is on the second link.

13. The method of claim 1, wherein the second resource allocation is determined to be a compliant resource based at least in part on the first resource allocation.

14. The method of claim 1, wherein the resource allocation policy is provisioned on the wireless node, configured on the wireless node, or communicated to the wireless node.

15. The method of claim 1, wherein the wireless node is positioned in a hierarchical relationship with the parent wireless node and the child wireless node.

16. The method of claim 1, wherein the first link and the second link are synchronized with respect to a frame structure.

17. The method of claim 1, wherein the wireless node is configured to transmit a resource allocation request with an uplink acknowledgement, an uplink negative acknowledgement, or uplink traffic.

18. The method of claim 1, wherein the wireless node is configured to communicate signaling related to the first resource allocation or the second resource allocation using at least one of a set of channels, a set of symbols, a set of resource blocks, or a set of resource elements.

19. A wireless node, comprising:
a memory; and
one or more processors operatively coupled to the memory, the memory and the one or more processors configured to:
receive, from a parent wireless node, a first scheduling command identifying a first resource allocation via a first link,
wherein the first scheduling command includes an implicit indication of a second resource allocation;
determine the second resource allocation based at least in part on the first resource allocation and a resource allocation policy;
transmit, to a child wireless node, a second scheduling command identifying the second resource allocation via a second link; and
communicate network traffic on the first link and the second link using the first resource allocation and the second resource allocation, respectively.

20. The wireless node of claim 19, wherein the wireless node is configured to communicate on the first link based at least in part on the first scheduling command and is configured to communicate on the second link based at least in part on the second scheduling command.

21. The wireless node of claim 19, wherein the first link is different from the second link.

22. A non-transitory computer-readable medium storing instructions, the instructions comprising:
one or more instructions that, when executed by one or more processors of a wireless node, cause the one or more processors to:
receive, from a parent wireless node, a first scheduling command identifying a first resource allocation via a first link,
wherein the first scheduling command includes an implicit indication of a second resource allocation;
determine the second resource allocation based at least in part on the first resource allocation and a resource allocation policy;
transmit, to a child wireless node, a second scheduling command identifying the second resource allocation via a second link; and
communicate network traffic on the first link and the second link using the first resource allocation and the second resource allocation, respectively.

23. The non-transitory computer-readable medium of claim 22, wherein the wireless node is configured to communicate on the first link based at least in part on the first scheduling command and is configured to communicate on the second link based at least in part on the second scheduling command.

24. The non-transitory computer-readable medium of claim 22, wherein the first link is different from the second link.

25. An apparatus, comprising:
means for receiving, from a parent wireless node, a first scheduling command identifying a first resource allocation via a first link,
wherein the first scheduling command includes an implicit indication of a second resource allocation;
means for determining the second resource allocation based at least in part on the first resource allocation and a resource allocation policy;
means for transmitting, to a child wireless node, a second scheduling command identifying the second resource allocation via a second link; and
means for communicating network traffic on the first link and the second link using the first resource allocation and the second resource allocation, respectively.

26. The apparatus of claim 25, wherein the apparatus is configured to communicate on the first link based at least in part on the first scheduling command and is configured to communicate on the second link based at least in part on the second scheduling command.

27. The apparatus of claim 25, wherein the first link is different from the second link.

28. The apparatus of claim 25, wherein the first scheduling command is received on a first downlink control channel defined by a frame structure and the second scheduling command is transmitted on a second downlink control channel defined by the frame structure.

29. The apparatus of claim 25, wherein the first scheduling command or the second scheduling command includes at least one of a request for downlink traffic or a grant for uplink traffic.

30. The apparatus of claim 25, wherein the parent wireless node is upstream of the apparatus, and wherein the child wireless node is downstream of the apparatus.

* * * * *